United States Patent
Yan et al.

(10) Patent No.: US 11,972,582 B2
(45) Date of Patent: Apr. 30, 2024

(54) METHOD AND APPARATUS FOR ACQUIRING LABELED DATA, TRAINING METHOD AND APPARATUS, AND MEDICAL EQUIPMENT

(71) Applicants: OUR UNITED CORPORATION, Xi'an (CN); SHENZHEN OUR NEW MEDICAL TECHNOLOGIES DEVELOPMENT CO., LTD., Shenzhen (CN)

(72) Inventors: Hao Yan, Xi'an (CN); Jiuliang Li, Xi'an (CN); Tianchang Gou, Xi'an (CN); Jinsheng Li, Shenzhen (CN)

(73) Assignees: Our United Corporation, Xi'an (CN); Shenzhen Our New Medical Technologies Development Co., Ltd., Shenzhen (CN)

(*) Notice: Subject to any disclaimer, the term of this patent is extended or adjusted under 35 U.S.C. 154(b) by 578 days.

(21) Appl. No.: 17/257,842

(22) PCT Filed: Jul. 3, 2018

(86) PCT No.: PCT/CN2018/094317
§ 371 (c)(1),
(2) Date: Jan. 4, 2021

(87) PCT Pub. No.: WO2020/006681
PCT Pub. Date: Jan. 9, 2020

(65) Prior Publication Data
US 2021/0295544 A1    Sep. 23, 2021

(51) Int. Cl.
*G06T 7/33* (2017.01)
*G06N 20/00* (2019.01)
*G06T 7/00* (2017.01)

(52) U.S. Cl.
CPC ............. *G06T 7/337* (2017.01); *G06N 20/00* (2019.01); *G06T 7/0012* (2013.01);
(Continued)

(58) Field of Classification Search
CPC ................... G06T 7/337; G06T 7/0012; G06T 2207/10064; G06T 2207/10081;
(Continued)

(56) References Cited

U.S. PATENT DOCUMENTS

2008/0273784 A1    11/2008   Pfister
2008/0317321 A1*   12/2008   Zhang .................... G06T 15/08
                                                      382/132
(Continued)

FOREIGN PATENT DOCUMENTS

CN    101903908 A    12/2010
CN    104637061 A    5/2015
(Continued)

OTHER PUBLICATIONS

International search report in PCT application No. PCT/CN2018/094317 dated Apr. 10, 2019.
(Continued)

*Primary Examiner* — Michael R Neff
(74) *Attorney, Agent, or Firm* — Knobbe, Martens, Olson & Bear, LLP

(57) ABSTRACT

Provided is a method for acquiring labeled data, including acquiring a 3D-3D registration sample, wherein the 3D-3D registration sample includes a sample 3D image, a reference 3D image and 3D-3D registration data, and the 3D-3D registration data includes correspondence data between the sample 3D image and the reference 3D image; generating at least one dual-2D-image based on the sample 3D image, wherein each dual-2D-image is a combination of 2D projection images of the sample 3D image in two different
(Continued)

directions; and generating 2D-3D registration data corresponding to each dual-2D-image based on the 3D-3D registration data, wherein each 2D-3D registration data includes correspondence data between the dual-2D-image and the reference 3D image.

15 Claims, 4 Drawing Sheets

(52) U.S. Cl.
CPC .............. *G06T 2207/10064* (2013.01); *G06T 2207/10081* (2013.01); *G06T 2207/10088* (2013.01); *G06T 2207/10121* (2013.01); *G06T 2207/10132* (2013.01)

(58) Field of Classification Search
CPC . G06T 2207/10088; G06T 2207/10121; G06T 2207/10132; G06N 20/00
USPC .......................................................... 382/128
See application file for complete search history.

(56) References Cited

U.S. PATENT DOCUMENTS

| | | | |
|---|---|---|---|
| 2010/0266220 | A1 | 10/2010 | Zagorchev et al. |
| 2015/0030229 | A1 | 1/2015 | Borsdorf |
| 2019/0149797 | A1* | 5/2019 | Casas ................... H04N 13/111 348/47 |

FOREIGN PATENT DOCUMENTS

| | | | |
|---|---|---|---|
| CN | 106373163 | A | 2/2017 |
| CN | 106408509 | A | 2/2017 |
| CN | 107170005 | A | 9/2017 |
| EP | 2048617 | A2 | 4/2009 |

OTHER PUBLICATIONS

Extended European search report of European application No. 18925436.0 dated Feb. 14, 2022.
Shun Miao et al., "Dilated FCN for Multi-Agent 2D/3D Medical Image Registration", arxiv.org, Cornell University Library, 201 Olin Library Cornell University Ithaca, NY14853, Nov. 22, 2017.
Lei Yang et al., "An improved 2D-3D medical image registration algorithm based on modified mutual information and expanded Powell method", 2013 IEEE International Conference on Medical Imaging Physics and Engineering, IEEE, Oct. 19, 2013, pp. 24-29.
China National Intellectual Property Administration, First office action of Chinese application No. 201880031837.9 dated Mar. 22, 2023, which is foreign counterpart application of this US application.
Wang Guanying et al., 3D-3D medical image registration method based on 3D-PCNN and mutual information, Journal of Computer Applications, vol. 37, No. z1, Jun. 15, 2017, pp. 215-219, 222.
Daniel Toth et al., 3D/2D model-to-image registration by imitation learning for cardiac procedures, International Journal of Computer Assisted Radiology and Surgery (2018) 13, pp. 1141-1149, May 12, 2018.
Lian Yuxi et al., Image Fusion of Dyna CT and Digital Subtraction Angiography for Arteriovenous Malformations, Journal of Biomedical Engineering, vol. 33, No. 05, Oct. 31, 2016, pp. 873-878 (14 pgs. with translation).
China National Intellectual Property Administration, Notification to grant patent right for invention of Chinese application No. 201880031837.9 issued on Feb. 1, 2024, which is foreign counterpart application of this US application.

* cited by examiner

METHOD AND APPARATUS FOR ACQUIRING LABELED DATA, TRAINING METHOD AND APPARATUS, AND MEDICAL EQUIPMENT

The present disclosure is a US national phase application of PCT Application No. PCT/CN2018/094317, filed on Jul. 3, 2018, the entire contents of which are incorporated herein by reference.

TECHNICAL FIELD

The present disclosure relates to the field of medical image technologies, and in particular relates to a method and an apparatus for acquiring labeled data, a training method and apparatus, and medical equipment.

BACKGROUND

Medical image registration refers to seeking a spatial transformation or a series of spatial transformations for a medical image, such that the points in the medical image have a spatial consistency with the corresponding points in another medical image. The consistency enables a same anatomical point, in a clinical case, to have same spatial position coordinates in two registered medical images, which is of great importance for clinical diagnosis and clinical treatment.

SUMMARY

The present disclosure provides a method and an apparatus for acquiring labeled data, a training method and apparatus, and medical equipment. The technical solutions are described as below.

In a first aspect, a method for acquiring labeled data is provided. The method includes:
   acquiring a 3D-3D registration sample, wherein the 3D-3D registration sample includes a sample 3D image, a reference 3D image and 3D-3D registration data, and the 3D-3D registration data includes correspondence data between the sample 3D image and the reference 3D image;
   generating at least one dual-2D-image based on the sample 3D image, wherein each dual-2D-image is a combination of 2D projection images of the sample 3D image in two different directions; and
   generating 2D-3D registration data corresponding to each dual-2D-image based on the 3D-3D registration data, wherein each 2D-3D registration data includes the correspondence data between the dual-2D-image and the reference 3D image.

In some embodiments, acquiring the 3D-3D registration sample includes:
   acquiring the reference 3D image and at least one set of sample 2D images, wherein each set of sample 2D images includes a number of 2D images acquired by imaging a same object in the number of different directions respectively;
   reconstructing each set of sample 2D images into one sample 3D image respectively; and
   acquiring the correspondence data between each sample 3D image and the reference 3D image by a 3D-3D image registration.

In embodiments, generating at least one dual-2D-image based on the sample 3D image includes:
   combining, in each set of sample 2D images, every two 2D images having a predetermined angular interval into the dual-2D-image.

In some embodiments, the 3D-3D registration data includes coordinates of a number of positioning points which are positioned in the sample 3D image, and the 2D-3D registration data includes coordinates of the number of positioning points in each 2D projection image of the dual-2D-image; and generating the 2D-3D registration data corresponding to each set of the dual-2D-images based on the 3D-3D registration data includes:
   converting the coordinates of the number of positioning points in the sample 3D image into the coordinates of the number of positioning points in each 2D projection image of the dual-2D-image, based on a projection relationship between any dual-2D-image and the sample 3D image.

In some embodiments, two 2D projection images of each dual-2D-image have a same image form as that of a computed tomography image, an X-ray fluoroscopy image, a nuclear magnetic resonance image, an ultrasonic image or a fluorescence fluoroscopy image.

In a second aspect, a training method is provided. The method includes:
   acquiring a number of labeled data by any one of the aforementioned methods for acquiring labeled data, wherein each of the labeled data includes one dual-2D-image and the 2D-3D registration data corresponding to the dual-2D-image; and
   training a machine learning model with the number of labeled data to determine model parameters for 2D-3D image registration,
   wherein input of the machine learning model includes the dual-2D-image, output of the machine learning model includes the 2D-3D registration data, and the number of labeled data are used as at least one of training data and test data during training.

In some embodiments, training a machine learning model with the number of labeled data to determine model parameters for 2D-3D image registration includes:
   optimizing the model parameters acquired based on the training data with the test data.

In a third aspect, an apparatus for acquiring labeled data is provided. The apparatus includes a processor and a memory storing a program instruction executable by the processor, wherein the processor is configured to:
   acquire a 3D-3D registration sample, wherein the 3D-3D registration sample includes a sample 3D image, a reference 3D image and 3D-3D registration data, and the 3D-3D registration data includes correspondence data between the sample 3D image and the reference 3D image;
   generate at least one dual-2D-image based on the sample 3D image, wherein each dual-2D-image is a combination of 2D projection images of the sample 3D image in two different directions; and
   generate 2D-3D registration data corresponding to each dual-2D-image based on the 3D-3D registration data, wherein each 2D-3D registration data includes the correspondence data between the dual-2D-image and the reference 3D image.

In some embodiments, the processor is further configured to:
   acquire the reference 3D image and at least one set of sample 2D images, wherein each set of sample 2D images includes a number of 2D images acquired by imaging a same object in the number of different directions respectively;

reconstruct each set of sample 2D images into one sample 3D image respectively; and acquire the correspondence data between each sample 3D image and the reference 3D image by a 3D-3D image registration.

In some embodiments, the processor is configured to combine, in each set of sample 2D images, every two 2D images having a predetermined angular interval into the dual-2D-image.

In some embodiments, the 3D-3D registration data includes coordinates of a number of positioning points which are positioned in the sample 3D image, and the 2D-3D registration data includes coordinates of the number of positioning points in each 2D projection image of the dual-2D-image; and the processor is further configured to:

convert the coordinates of the number of positioning points in the sample 3D image into the coordinates of the number of positioning points in each 2D projection image of the dual-2D-image, based on a projection relationship between any dual-2D-image and the sample 3D image.

In some embodiments, two 2D projection images of each dual-2D-image have a same image form as that of a computed tomography image, an X-ray fluoroscopy image, a nuclear magnetic resonance image, an ultrasonic image or a fluorescence fluoroscopy image.

In a fourth aspect, a training apparatus is provided. The training apparatus includes a processor and a memory storing a program instruction executable by the processor, wherein the processor is configured to:

acquire a number of labeled data by any one of the aforementioned methods for acquiring the labeled data, wherein each of the labeled data includes one dual-2D-image and 2D-3D registration data corresponding to the dual-2D-image; and train a machine learning model with the number of labeled data, to determine model parameters for 2D-3D image registration, wherein input of the machine learning model includes the dual-2D-image, output of the machine learning model includes the 2D-3D registration data, and the number of labeled data are used as at least one of training data and test data during training.

In some embodiments, the processor is further configured to optimize the model parameters acquired based on the training data with the test data.

In a fifth aspect, medical equipment is provided. The medical equipment includes a processor and a memory, wherein a program instruction is stored in the memory, and the processor is configured to call the program instruction in the memory to execute any one of the aforementioned methods for acquiring labeled data or any one of the aforementioned method for training.

In a six aspect, a computer-readable storage medium is provided. The computer-readable storage medium stores a computer program including a program instruction, and the program instruction, when being executed by a processor, causes the processor to execute the aforementioned methods for acquiring labeled data or any one of the aforementioned training method.

DETAILED DESCRIPTION

For clearer descriptions of the principles and advantages in the present disclosure, the implementation of the present disclosure is described in detail below in combination with the accompanying drawings. Apparently, the described embodiments are merely some embodiments, rather than all embodiments, of the present disclosure. Unless otherwise defined, technical terms or scientific terms used herein shall have the ordinary meanings as understood by the ordinary skill in the art to which the present disclosure belongs. The terms "first", "second", and the like used in the present disclosure do not denote any order, quantity, or importance, but are merely used to distinguish different components.

In application scenarios such as an image-guided surgery or an image-guided radiotherapy, real-time imaging including an image registration process needs to have sufficiently high imaging accuracies, imaging velocities, and robustness. In order to meet these requirements, it is theoretically possible to adopt a machine learning based image processing technology to construct a medical image registration model. However, in practical application, it is difficult to acquire the large amount of labeled data required for model training and guarantee the registration accuracies of the large amount of labeled data, which impedes the effective establishment of a machine-learning-based medical image registration method.

Figure 1:
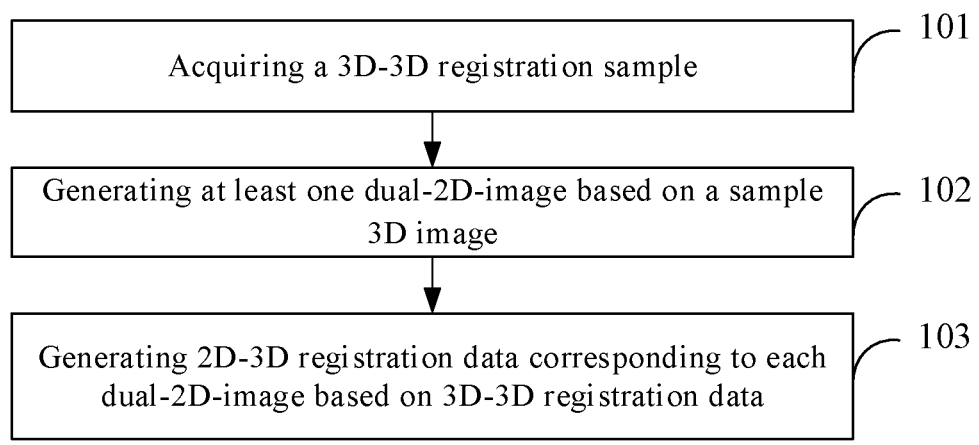
FIG. 1 is a flowchart showing a method for acquiring labeled data according to an embodiment of the present disclosure.

FIG. 1 is a flowchart showing a method for acquiring labeled data according to an embodiment of the present disclosure. With reference to FIG. 1, the method for acquiring labeled data includes the following steps.

In 101, a 3D-3D registration sample is acquired.

In 102, at least one dual-2D-image is generated based on a sample 3D image.

In 103: 2D-3D registration data corresponding to each dual-2D-image is generated based on 3D-3D registration data.

It should be noted that the labeled data refers to a set of samples labeled with one or more labels. In the embodiment of the present disclosure, for example, the labeled data may be two registered medical images, the registration result of which is regard as a label, to be used as a training sample or a test sample in machine learning.

It should also be noted that the 3D-3D registration sample includes a sample 3D image, a reference 3D image and 3D-3D registration data, wherein both the sample 3D image and the reference 3D image are 3D images in which each pixel has three independent coordinates, and the 3D-3D registration data includes correspondence data between the sample 3D image and the reference 3D image, which may be understood, for example, as data representing a specific transformation method when the sample 3D image is transformed into the reference 3D image. It should be understood that the 3D-3D registration sample may be understood, for example, as a template for guiding a machine learning model to learn how to perform 3D-3D image registration, although the 3D-3D registration sample in the embodiment of the present disclosure is not directly used for training the machine learning model. Further, in order to enable the machine learning model to achieve a better effect of image registration, at least one of the following methods may be adopted: 3D-3D registration samples are a plurality of registration samples covering various types of application scenes of image registrations; the imaging object of the sample 3D image and the reference 3D image in each 3D-3D registration sample are the same (for example, a medical image of a same part of a human body); both the sample 3D image and the reference 3D image in each 3D-3D registration sample have sufficiently high imaging quality and imaging precision; and in the process of acquiring the 3D-3D registration data in each 3D-3D registration sample, the image registration method that is more time-consuming but has higher registration accuracy is adopted, for example, an image registration algorithm that has higher application accuracy but is more time-consuming is adopted, and/or the registration result acquired by a computer is manually corrected by a plurality of professionals.

It should also be understood that "acquiring a 3D-3D registration sample" includes, for example, at least one of collecting the sample 3D image, collecting the reference 3D image and computing the 3D-3D registration data, or includes, for example, receiving at least one of the sample 3D image, the reference 3D image and the 3D-3D registration data from a memory or an external device. That is, each item of data in the 3D-3D registration sample is directly acquired by an executive subject of the method for acquiring the labeled data, or is acquired by an external subject other than the executive subject and transmitted to the executive subject.

It should also be understood that any data that capable of representing the correspondence between the concerned sample 3D image and the reference 3D image during image registration is used as the aforementioned 3D-3D registration data. In one example, the relative position coordinates of a same positioning point (or a homologous point which includes, for example, an anatomical point or an image feature point) between the sample 3D image and the reference 3D image are used as the aforementioned 3D-3D registration data. In another example, a transformation matrix between the sample 3D image and the reference 3D image is used as the aforementioned 3D-3D registration data. In yet another example, a correspondence table between regions of homologous images in the sample 3D image and the reference 3D image is adopted as the aforementioned 3D-3D registration data. There is no doubt that the specific forms of the 3D-3D registration data are not limited to the above examples.

It should also be noted that each dual-2D-image is a combination of 2D projection images of the sample 3D image in two different directions. It should be understood that each dual-2D-image includes two 2D projection images, that each 2D projection image is a 2D image in which each pixel has two independent coordinates, and that each 2D projection image may be acquired by projecting the sample 3D image in the corresponding direction. In one example, each pixel of the sample 3D image is a coordinate point in an XYZ space, and each pixel has a pixel value of its own. In this way, a 2D projection image of the sample 3D image in the X-axis direction is acquired by the following projecting method: each pixel of the 2D projection image is a coordinate point in a YZ plane, and for any pixel with coordinates (Yn, Zn), the pixel value is equal to a sum of pixel values of all pixels whose coordinates of Y-axis are Yn and coordinates of Z-axis are Zn in the sample 3D image. In the same way, a 2D projection image of the sample 3D image in the Z-axis direction, in which each pixel is a coordinate point on an XY plane, may be also acquired. The 2D projection image in the X-axis direction and the 2D projection image in the Z-axis direction may form the dual-2D-image.

In an example, the dual-2D-images which are input to the machine learning model in the practical application scenes have relatively fixed image forms, such as a computed tomography image, an X-ray fluoroscopy image, a nuclear magnetic resonance image, an ultrasonic image or a fluorescence fluoroscopy image. In this way, the aforementioned 102 includes: generating a number of 2D projection images having a predetermined image form based on the sample 3D image, and combining the number of 2D projection images into at least one dual-2D-image, wherein the predetermined image form is, for example, the image form of the dual-2D-image which is input to the machine learning model in the practical application scene. It should be understood that, for example, the 2D projection image in the image form of an ultrasonic image does not need to be an image acquired by ultrasonic imaging, but only needs to have the same image form as the image acquired by ultrasonic imaging. In this way, the forms of input of the machine learning model during the training process and the using process is made more similar, which is conductive to improving the effect of the image registration implemented by the machine learning model.

It should also be noted that each 2D-3D registration data includes the correspondence data between a dual-2D-image and the reference 3D image, which is understood, for example, as data representing a specific transformation method when the dual-2D-image is transformed into the reference 3D image. Based on the form adopted by the aforementioned 3D-3D registration data, the 2D-3D registration data may have a corresponding form. In one example, each pixel of a sample 3D image is a coordinate point in an XYZ space, and each pixel has a pixel value of its own, and a dual-2D-image includes a 2D projection image of the sample 3D image in the X-axis direction and a 2D projection image of the sample 3D image in the Z-axis direction. Thus, for a positioning point with coordinates (Xa, Ya, Za) in the sample 3D image, the coordinates of the positioning point in the 2D projection image in the X-axis direction are (Ya, Za) and the coordinates of the positioning point in the 2D projection image in the Z-axis direction are (Xa, Ya). Therefore, the coordinates (Ya, Za) and (Xa, Ya) are the coordinates of a relative position of the positioning point between the sample 3D image and the dual-2D-image, which is used as a set of data in the aforementioned 2D-3D registration data.

It can be understood that each dual-2D-image and 2D-3D registration data corresponding thereto, and the reference 3D image form a 2D-3D registration sample. Each 2D-3D registration sample, as a training sample in machine learning, is configured to guide the machine learning model to learn how to perform image registration between the dual- 2D-image and the reference 3D image and acquire corresponding 2D-3D registration data. Each 2D-3D registration sample, as a test sample in machine learning, is also configured to detect a difference between the result of image registration between the dual-2D-image and the reference 3D image by the machine learning model, and the 2D-3D registration data which is used as a standard result. That is, each 2D-3D registration sample is used as labeled data required by machine learning. In one example, the reference 3D image of all samples is the same 3D image, and in this case, the reference 3D image may be omitted in each labeled data. In another example, the reference 3D image of all samples is one of a plurality of 3D images, and in this case, the image data itself of the reference 3D image may be replaced by a serial number of the reference 3D image in the plurality of 3D images in each labeled data. It can be seen that the amount of data in each labeled data can be reduced in both examples and the amount of data of each sample may also be reduced in the same way.

It can be seen that the a plurality of independent 2D-3D registration samples are generated based on the 3D-3D registration sample by the aforementioned method, and the registration accuracy of each 2D-3D registration sample is guaranteed by the registration accuracy of the 3D-3D registration sample. That is, a large number of 2D-3D registration samples with the same grade of registration accuracies are acquired based on a small amount of 3D-3D registration samples by the aforementioned method. These 2D-3D registration samples is used as training samples and/or test samples of the machine learning model of 2D-3D image registration. Therefore, according to the aforementioned method, a large amount of labeled data with high registration accuracies are easily acquired, thereby solving the problems that a large amount of labeled data are difficult to be acquired and that the image registration accuracies of a large amount of labeled data are difficult to be guaranteed in related arts, which is conductive to effectively establishing a medical image registration method based on machine learning.

In order to illustrate the technical effects of the embodiments of the present disclosure more clearly, two comparative examples based on intuitive technical concepts are introduced below, and compared with the embodiments of the present disclosure in terms of technical effects.

In a comparative example, in order to establish a machine learning model for 2D-3D image registration, a large number of dual-2D-images are collected in advance, and the registration result between these dual-2D-images and the reference 3D image are acquired by a traditional method of 2D-3D image registration, so as to acquire the required 2D-3D registration sample.

In the comparative example, a complete set of medical image acquisition processes is to be performed for acquiring each dual-2D-image. Moreover, it is impossible to perform acquisition too many times on the same individual, considering the radiation doses and other issues. In addition, the registration result with high accuracies cannot be efficiently acquired by the traditional 2D-3D image registration, and manual processing which is capable of improving accuracies greatly increases the time required for registration. Therefore, although the medical image registration method based on machine learning is theoretically implemented in the comparative example, there are great difficulties in acquiring a large number of dual-2D-images, implementing high-efficiency registration, and ensuring the registration accuracies of a large number of registration samples. Compared with the comparative example, the embodiment of the present disclosure not only omits the process of acquiring and registering a large number of dual-2D-images, but also ensures the registration accuracy of each 2D-3D registration sample while ensuring high efficiencies. In this way, the time for acquiring the required machine learning model can be greatly shortened, and the medical image registration implemented by the machine learning model has a sufficiently high registration accuracy.

In another comparative example, in order to establish a machine learning model for 3D-3D image registration, a large number of sample 3D images are acquired in advance, and the registration result between these sample 3D images and the reference 3D image is acquired by a 3D-3D image registration, so as to acquire the required 3D-3D registration sample.

In the comparative example, the complete set of medical image acquisition processes is to be performed for acquiring each sample 3D image. Moreover, it is impossible to perform acquisition too many times on the same individual, considering the radiation doses and other issues. In addition, compared with the acquisition process of the dual-2D-images, the acquisition of the 3D image requires more time and greater radiation doses, which not only makes the acquisition of a large number of sample 3D images difficult to implement, but also makes an interval between two adjacent acquisitions of 3D images relatively long, such that it is difficult to meet the application requirement of real-time imaging in application scenarios such as an image-guided therapy. Compared with the comparative example, the embodiments of the present disclosure not only omits the process of acquiring and registering a large number of sample 3D images, but also helps implementing the image-guided therapy with better real-time performance, higher accuracies and enhanced security by making use of the characteristics of fast imaging velocities and small radiation doses during the acquisition of the dual-2D-images.

Figure 2:
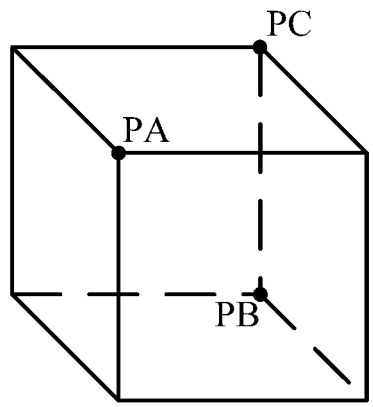
FIG. 2 is a schematic diagram of a sample 3D image according to an embodiment of the present disclosure.
Figure 3:
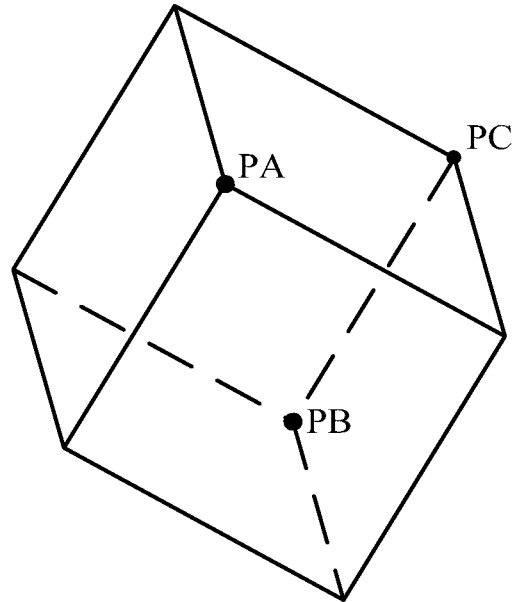
FIG. 3 is a schematic diagram of a reference 3D image according to an embodiment of the present disclosure.

FIG. 2 is a schematic diagram of a sample 3D image according to an embodiment of the present disclosure, and FIG. 3 is a schematic diagram of a reference 3D image according to an embodiment of the present disclosure. With reference to FIG. 2, the pixels, whose pixel values are not zero, of the sample 3D image in the 3D space form a cube structure, and the positioning points PA, PB and PC are vertexes of the cube structure respectively. With reference to FIG. 3, correspondingly, the pixels, whose pixel values are not zero in the 3D space, of the reference 3D image form a cube structure, and the positioning points PA, PB and PC is vertexes of the cube structure respectively. By a comparison between FIGS. 2 and 3, it can be seen that, compared with the cube structure in the sample 3D image, the cube structure in the reference 3D image has undergone two graphic transformations, magnification and rotation, and the position coordinates of the three positioning points PA, PB and PC in the reference 3D image, in comparison with the three positioning points PA, PB and PC in the sample 3D image, changes in a way corresponding to the transformation method of the aforementioned graphic transformations. In one example, the reference 3D image is a 3D image shared by all samples, and the coordinates of the three positioning points PA, PB, and PC in the reference 3D image are known and fixed. Thus, the coordinates of the three positioning points PA, PB and PC in the sample 3D image is used as the aforementioned 3D-3D registration data which forms the 3D-3D registration sample with the sample 3D image. Corresponding to the scene, the aforementioned 101 includes: determining the coordinates of each positioning point in the sample 3D image by referring to the reference 3D image and coordinates of at least one positioning point in the reference 3D image. It should be understood that, for example, an image registration algorithm is adopted to find a transformation relationship between the sample 3D image and the reference 3D image, so as to determine the coordinates of each positioning point in the sample 3D image based on the coordinates of each positioning point in the reference 3D image according to the transformation relationship.

Figure 4:
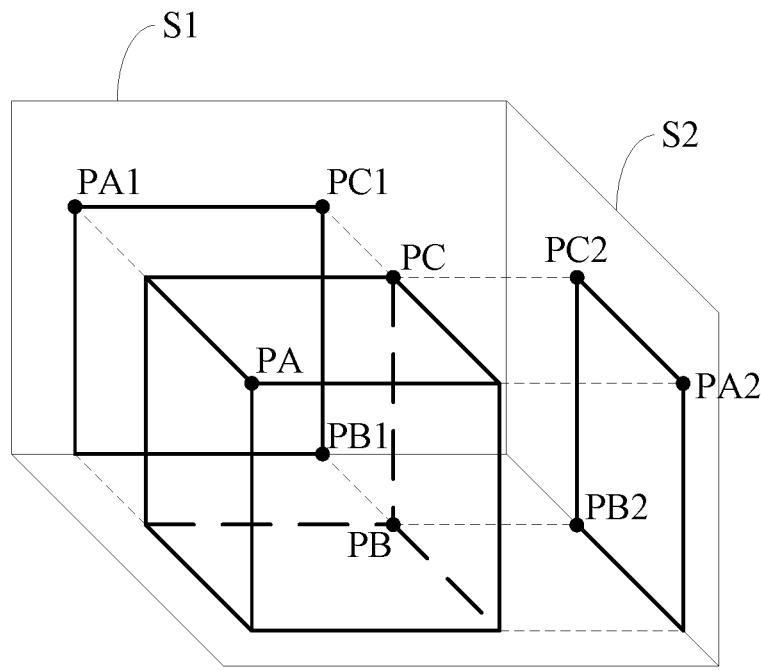
FIG. 4 is a schematic diagram of a method for generating a dual-2D-image according to an embodiment of the present disclosure.

FIG. 4 is a schematic diagram of a method for generating a dual-2D-image according to an embodiment of the present disclosure. With reference to FIG. 4, the sample 3D image shown in FIG. 2 forms a 2D projection image on each of a first plane S1 and a second plane S2 respectively, and the two 2D projection images forms a dual-2D-image. The 2D-3D registration data corresponding to the dual-2D-image is acquired by projecting and computing the positioning point. For example, a projecting point PA1 of the positioning point PA in the 3D sample image on the first plane S1 is the positioning point in the 2D projection image on the first plane S1, and the 2D coordinates of the positioning point are acquired by projecting and computing the 3D coordinates of the positioning point PA. Likewise, the 2D coordinates of the projecting point PB1 of the positioning point PB on the first plane S1, the 2D coordinates of the projecting point PC1 of the positioning point PC on the first plane S 1, the 2D coordinates of the projecting point PA2 of the positioning point PA on the second plane S2, the 2D coordinates of the projecting point PB2 of the positioning point PB on the second plane S2, and the 2D coordinates of the projecting point PC2 of the positioning point PC on the second plane S2 are acquired in the same way. Thus, coordinates of each positioning point in the 2D projection image on the first plane S1 and the coordinates of each positioning points in the 2D projection image on the second plane S2 are used as the 2D-3D registration data corresponding to the dual-2D-image. The 2D-3D registration data and the dual-2D-image form a 2D-3D registration sample.

It should be understood that more dual-2D-images are acquired by referring to the aforementioned generating method, and a projecting direction of each 2D projection image is not limited to a direction parallel with or perpendicular to a coordinate axis. Moreover, an included angle of projecting directions of two 2D projection images in the dual-2D-image is not limited to 90°, but may also be any angle such as 30°, 60°, 120°, 150°, or the like, and may, for example, be set according to the image form of the dual-2D-image which is input into the machine learning model in the aforementioned practical application scenes. Corresponding to the situation in which the aforementioned 2D-3D registration data includes coordinates of a number of positioning points in each 2D projection image of the dual-2D-image, the aforementioned 103 includes: converting the coordinates of the number of positioning points in the sample 3D image into the coordinates of the number of positioning points in each 2D projection image of the dual-2D-image, according to a projection relationship between any dual-2D-image and the sample 3D image.

It can be seen that based on the 3D-3D registration sample which includes the sample 3D image as shown in FIG. 2, any number of 2D-3D registration samples can be generated, the main differences between different 2D-3D registration samples are projection directions and angular intervals of the two 2D projection images in the dual-2D-image. Moreover, as long as the coordinates of each positioning point in the sample 3D image are sufficiently accurate, the coordinates of each positioning point in the dual-2D-image can also be equally accurate. That is, the registration accuracy of each 2D-3D registration sample can be guaranteed. For each sample 3D image, a number of 2D-3D registration samples can be generated in the same way. Thus, a large amount of labeled data with high registration accuracies are easily acquired in the embodiments of the present disclosure, thereby solving the problems that a large amount of labeled data are difficult to be acquired and that the image registration accuracies of the large amount of labeled data are difficult to be guaranteed in related arts, which is conductive to effectively establishing a medical image registration method based on machine learning.

Figure 5:
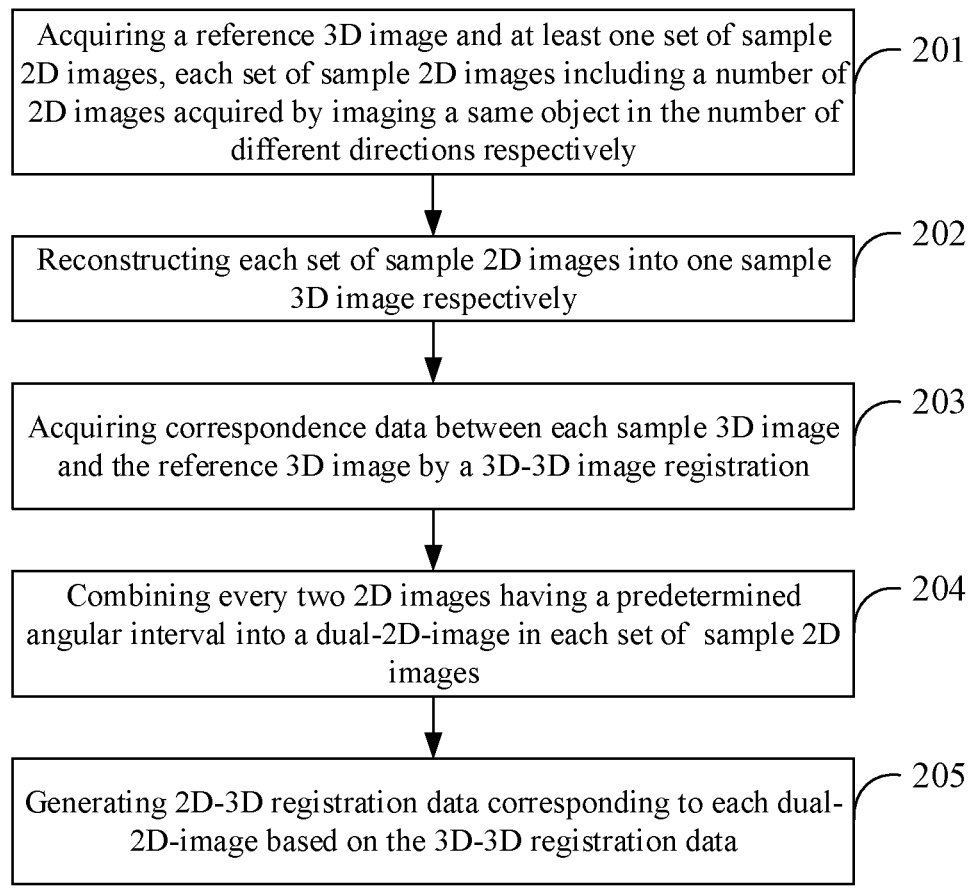
FIG. 5 is a flowchart showing a method for acquiring labeled data according to an embodiment of the present disclosure.

FIG. 5 is a flowchart of a method for acquiring labeled data according to an embodiment of the present disclosure. With reference to FIG. 5, the method for acquiring labeled data includes the following steps.

In 201, a reference 3D image and at least one set of sample 2D images are acquired, and each set of sample 2D images includes a number of 2D images acquired by imaging a same object in the number of different directions respectively.

In 202, each set of sample 2D images is reconstructed into a sample 3D image respectively.

In 203, correspondence data between each sample 3D image and the reference 3D image is acquired by a 3D-3D image registration.

In 204, in each set of sample 2D images, every two 2D images having a predetermined angular interval are combined into a dual-2D-image.

In 205, 2D-3D registration data corresponding to each dual-2D-image is generated based on 3D-3D registration data.

It should be understood that the process from 201 to 203 in the embodiment of the present disclosure belongs to an example implementation of the aforementioned 101, that 204 belongs to an example implementation of the aforementioned 102, and that 205 and the aforementioned 103 have the same implementation.

In one example, the aforementioned 201 includes: performing a cone beam computed tomography (CBCT) on each of M objects in 2N different directions, so as to acquire M sets of 2N 2D images, where both M and N are positive integers. The aforementioned 202 includes: performing 3D reconstruction on each set of 2N 2D images respectively, so as to acquire a total of M sample 3D images corresponding to each object respectively. The aforementioned 203 includes: performing 3D-3D image registration between each sample 3D image and the reference 3D image respectively, so as to acquire a total of M sets of coordinates of all positioning points in each sample 3D image. The aforementioned 204 includes: pairing each set of 2N 2D images at each of K types of angular intervals respectively, so as to acquire M*N*K dual-2D-images. For example, two 2D images having an angular interval of 60° are selected from 2N 2D images to form a dual-2D-image at the angular interval of 60°, and repeat the process to acquire N dual-2D-images having the angular interval of 60°; and then, two 2D images having an angular interval of 90° are selected from 2N 2D images to form a dual-2D-image at the angular interval of 90°, and repeat the process to acquire N dual-2D-images having the angular interval of 90°. The aforementioned 205 includes: decomposing the coordinates of each positioning point in the sample 3D image by geometric computing, so as to acquire the coordinates of each positioning point in each 2D image. Based on the aforementioned process, M*N*K 2D-3D registration samples can be acquired, as the labeled data. For example, when M=100, N=200, and K=45, M*N*K=900000 2D-3D registration samples can be acquired by the aforementioned process.

In the aforementioned two comparative examples, 18,000,000 image acquisitions and 900,000 image registrations shall be performed to acquire 900,000 2D-3D registration samples, and the image registrations have very low registration accuracies because the processing time is limited; 900,000 image acquisitions and 900,000 image registrations shall be performed to acquire 900,000 3D-3D registration samples. In the aforementioned examples, only 400 2D image acquisitions at different angles shall be performed on 100 objects respectively, and the image registrations shall be performed only between 100 sample 3D images and the same reference 3D image. In addition, the registration accuracy of each 2D-3D registration sample is guaranteed by the registration accuracy of 3D-3D image registration. After comparison, it is easy to know that a large amount of labeled data with high registration accuracies are easily acquired in the embodiments of the present disclosure, thereby solving the problems that a large amount of labeled data are difficult to be acquired and that the image registration accuracies of the large amount of labeled data are difficult to be guaranteed in related arts, which is conductive to effectively establishing a medical image registration method based on machine learning.

It should be understood that a number of 2D images acquired by imaging the same object in the number of different directions may also be acquired by at least one of X-ray fluoroscopy image, a nuclear magnetic resonance image, an ultrasonic image, a fluorescence fluoroscopy image and other types of computed tomography images, which is not limited to the aforementioned examples. Compared with the method for acquiring the dual-2D-image by projecting the sample 3D image, the dual-2D-images in the 2D-3D registration samples are actually acquired images according to the embodiment of the present disclosure, which is more conductive to improving the performance of the machine learning model in terms of the 2D-3D images registration compared with the dual-2D-images generated by computation.

Figure 6:
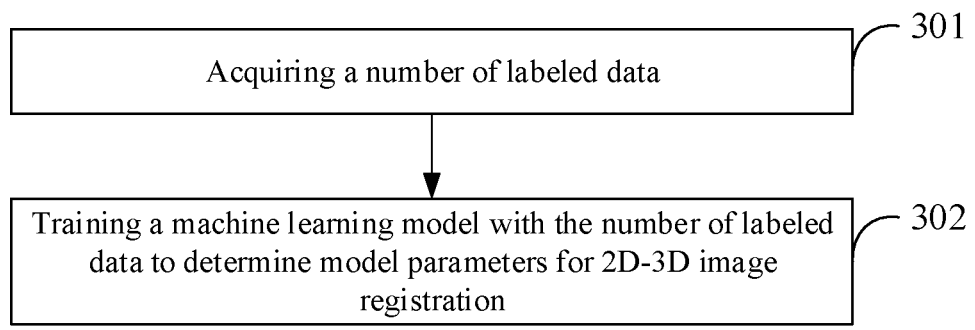
FIG. 6 is a flowchart of a training method according to an embodiment of the present disclosure.

FIG. 6 is a flowchart of a training method according to an embodiment of the present disclosure. With reference to FIG. 6, the training method includes the following steps.

In 301, a number of labeled data are acquired.

Each of the labeled data includes one dual-2D-image and 2D-3D registration data corresponding to the dual-2D-image, and the number of labeled data is acquired by, for example, any one of the aforementioned methods for acquiring the labeled data.

In 302, a machine learning model is trained with the number of labeled data to determine model parameters for 2D-3D image registration.

Input of the machine learning model includes the dual-2D-image in the 2D-3D registration sample, output of the machine learning model includes the 2D-3D registration data in the 2D-3D registration sample, and the number of labeled data are used as at least one of training data and test data during training.

In one example, (M−1)*N*K 2D-3D registration samples in the aforementioned M*N*K 2D-3D registration samples are loaded into a deep learning framework of a convolutional neural network (CNN), as training data, so as to be trained to acquire the machine learning model which has the framework of convolutional neural network and is used for 2D-3D image registration. In another example, N*K 2D-3D registration samples which are not used as training data in M*N*K 2D-3D registration samples are loaded into the deep learning framework of the convolutional neural network, as test data, such that actual performance of the machine learning model is tested by comparing the registration result acquired from the machine learning model with the 2D-3D registration data, or such that the test data is used for reinforced learning. In addition, the dual-2D-image without 2D-3D registration data may be loaded into the deep learning framework to implement semi-supervised deep learning.

In one example, the aforementioned 302 includes: optimizing model parameters acquired based on the training data with the test data. In some embodiments, the training process in 302 includes performing an iterative process for gradually optimizing model parameters, and ending the iterative process when a matching degree between the machine learning model and the test data reaches a desired level, such that the final model parameters are determined as the model parameters for 2D-3D image registration. It should be understood that after the dual-2D-image in the test data is input into the machine learning model, the closer the output of the machine learning model is to the 2D-3D registration data in the test data, the higher the matching degree between the machine learning model and the test data is. In this example, for example, Deep Q-Learning, Monte-Carlo Learning, Double Deep Q-Network, and Competitive Deep Q-Network or other enhanced learning or autonomous learning mechanisms may be adopted in the aforementioned training process.

It can be understood that, since the aforementioned method for acquiring labeled data can provide a large number of labeled data with high registration accuracies, it may achieve a better training effect and acquire a machine learning model with better performance compared with the method training in related arts that cannot have expected performance due to the limited amount of labeled data. It should be understood that the method training can also be implemented based on, for example, at least one of a K-nearest neighbor (KNN), a decision tree, a support vector machine (SVM) and a back-propagation neural network (BPNN), not being limited to the above examples.

Figure 7:
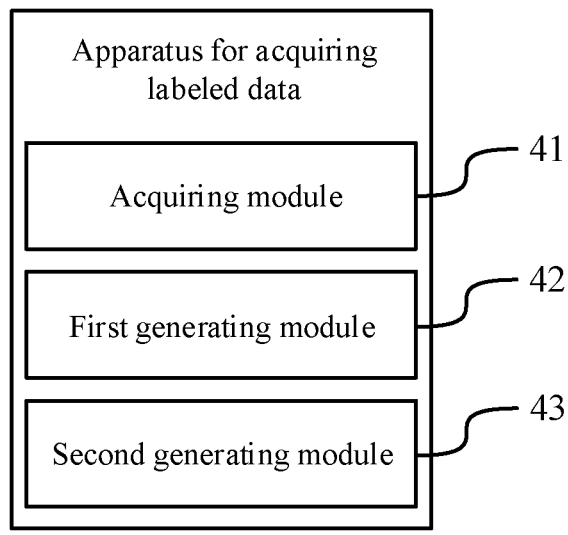
FIG. 7 is a structural block diagram of an apparatus for acquiring labeled data according to an embodiment of the present disclosure.

FIG. 7 is a structural block diagram of an apparatus for acquiring labeled data according to an embodiment of the present disclosure. With reference to FIG. 7, an apparatus for acquiring labeled data includes:

an acquiring module 41, configured to acquire a 3D-3D registration sample, wherein the 3D-3D registration sample includes a sample 3D image, a reference 3D image and 3D-3D registration data, and the 3D-3D registration data includes correspondence data between the sample 3D image and the reference 3D image;

a first generating module 42, configured to generate at least one dual-2D-image based on the sample 3D image, wherein each dual-2D-image is a combination of 2D projection images of the sample 3D image in two different directions; and a second generating module 43, configured to generate 2D-3D registration data corresponding to each dual-2D-image based on the 3D-3D registration data, wherein each 2D-3D registration data includes the correspondence data between the dual-2D-image and the reference 3D image.

In some embodiments, the acquiring module 41 includes:

an acquiring unit, configured to acquire a reference 3D image and at least one set of sample 2D images, wherein each set of sample 2D images includes a number of 2D images acquired by imaging a same object in the number of different directions respectively;

a reconstructing unit, configured to reconstruct each set of sample 2D images into one sample 3D image respectively; and a registering unit, configured to acquire the correspondence data between each sample 3D image and the reference 3D image by a 3D-3D image registration.

In some embodiments, the first generating module 42 is configured to combine, in each set of sample 2D images, every two 2D images having a predetermined angular interval into the dual-2D-image.

In some embodiments, the 3D-3D registration data includes coordinates of a number of positioning points in the sample 3D image, and the 2D-3D registration data includes coordinates of the number of positioning points in each 2D projection image of the dual-2D-image; and generating the 2D-3D registration data corresponding to each set of the dual-2D-images based on the 3D-3D registration data includes:

converting the coordinates of the number of positioning points in the sample 3D image into the coordinates of the number of positioning points in each 2D projection image of the dual-2D-image, based on a projection relationship between any dual-2D-image and the sample 3D image.

In some embodiments, two 2D projection images of each dual-2D-image have a same image form as that of a computed tomography image, an X-ray fluoroscopy image, a nuclear magnetic resonance image, an ultrasonic image or a fluorescence fluoroscopy image.

It should be understood that, based on the optional embodiments of the aforementioned methods for acquiring labeled data, the apparatus for acquiring the labeled data may implement any one of the aforementioned methods for acquiring labeled data by corresponding structures and configurations. The specific details are not repeated herein.

Figure 8:
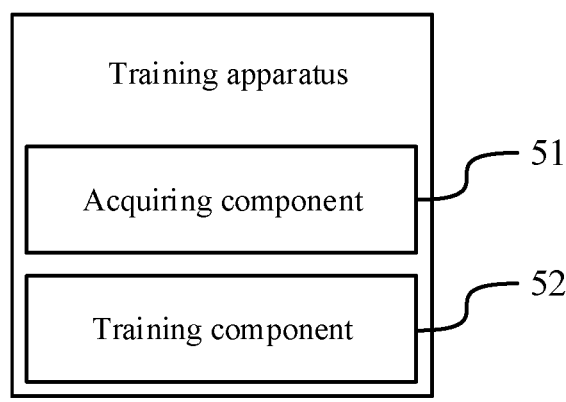
FIG. 8 is a structural block diagram of a training apparatus of labeled data according to an embodiment of the present disclosure.

FIG. 8 is a structural block diagram of a training apparatus of labeled data according to an embodiment of the present disclosure. With reference to FIG. 8, the training apparatus includes:

an acquiring component 51, configured to acquire a number of labeled data by any one of the aforementioned methods for acquiring labeled data, wherein each of the labeled data includes one dual-2D-image and 2D-3D registration data corresponding to the dual-2D-image; and a training component 52, configured to train a machine learning model with the number of labeled data, to determine model parameters for 2D-3D image registration, wherein input of the machine learning model includes the dual-2D-image, output of the machine learning model includes the 2D-3D registration data, and the number of labeled data are used as at least one of training data and test data during training.

In some embodiments, the training component is further configured to optimize the model parameters acquired based on the training data with the test data.

It should be understood that, based on the optional embodiments of the aforementioned training method, the training apparatus may implement any one of the aforementioned training method by corresponding structures and configurations. The specific details are not repeated herein.

In the examples corresponding to FIGS. 7 and 8, the apparatus or device is presented in a form of functional units/functional modules. The "units/modules" here may refer to application specific integrated circuits (ASICs), processors and memories that execute one or more software or firmware programs, integrated logic circuits, and/or other devices that may provide the aforementioned functions. In some embodiments, at least a part of the functions of at least one of the units and modules may be implemented by a processor to execute program codes stored in the memory.

Figure 9:
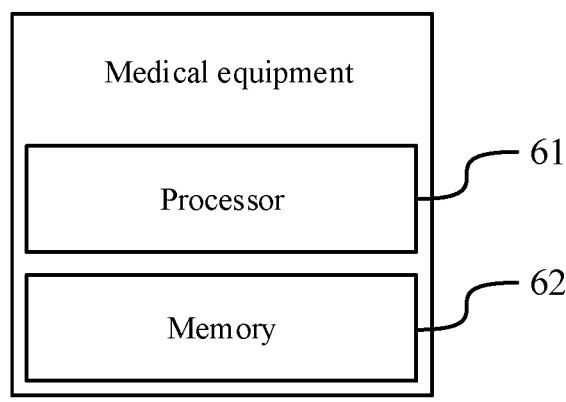
FIG. 9 is a structural block diagram of medical equipment according to an embodiment of the present disclosure.

FIG. 9 is a structural block diagram of medical equipment according to an embodiment of the present disclosure. With reference to FIG. 9, the medical equipment includes a processor 61 and a memory 62, wherein a program instruction is stored in the memory 62, and the processor 61 is configured to call the program instruction in the memory 62 to execute any one of the aforementioned methods for acquiring labeled data or any one of the aforementioned training method.

The processor 61 may include a central processing unit (CPU, single-core or multi-core), a graphics processing unit (GPU), a microprocessor, an application-specific integrated circuit (ASIC), a digital signal processor (DSP), a digital signal processing device (DSPD), a programmable logic device (PLD), a field programmable gate array (FPGA), a controller, a micro control unit, or a plurality of integrated circuits for controlling program execution.

The memory 62 may include a read-only memory (ROM) or other types of static storage devices capable of storing static information and instructions, a random access memory (RAM), or other types of dynamic storage devices capable of storing information and instructions. The memory 62 may also include an electrically erasable programmable read-only memory (EEPROM), a compact disc read-only memory (CD-ROM) or other optical disk storage, optical disk storage including a compact disc, a laser disc, an optical disc, a digital versatile disc, a Blu-ray disc, and the like), magnetic disk storage media or other magnetic storage devices, or any other media may be used to carry or store desired program codes in the form of instructions or data structures and may be accessed by a computer, but not limited to the above. The memory may be provided independently or integrated with the processor.

In specific implementation, as an embodiment, the processor 61 may include one or more CPUs. In specific implementation, as an embodiment, the aforementioned medical equipment may include a plurality of CPUs. Each of these processors may be a single-core processor or a multi-core processor. The processor here may refer to one or more devices, circuits, and/or processing cores for processing data, such as a computer program instruction.

The aforementioned medical equipment may include a general-purpose computer device or a special-purpose computer device. In specific implementation, the medical equipment may be any electronic equipment that requires medical radio-image registration, such as radiotherapy equipment, image-guided medical equipment, or an operating table. The computer device may be a desktop computer, a portable computer, a network server, a personal digital assistant (PDA), a mobile phone, a tablet computer, a wireless terminal device, a communication device, an embedded device or a device with a similar structure.

The embodiment of the present disclosure further provides a computer storage medium which is configured to store a computer program used by any one of the aforementioned methods for acquiring labeled data or any one of the aforementioned training method. The computer program includes a program instruction. By executing the stored program, any one of the methods for acquiring labeled data or any one of the aforementioned training method provided by the present disclosure may be implemented.

It should be appreciated by those skilled in the art that, the embodiments of the present disclosure may be provided as methods, apparatus (devices) or computer program products. Therefore, the present disclosure may adopt embodiments in forms of hardware only, software only, or a combination of software and hardware. Furthermore, the present disclosure may adopt forms of computer program products executed on one or more computer usable storage media (including but not being limited to disk storage, CD-ROM, and optical storage, and the like) containing computer usable program codes. The computer program is stored/distributed in a suitable medium, provided with other hardware or used as a part of the hardware, and the computer program may also be distributed in other forms, for example, by the Internet or other wired or wireless telecommunication systems.

The present disclosure is described with reference to the flowcharts and/or block diagrams of the method, the apparatus (device) and the computer program product according to the embodiments of the present disclosure. It should be understood that each process and/or block in the flowcharts and/or block diagrams, and combinations of processes and/or blocks in the flowcharts and/or block diagrams, may be realized by computer program instructions. A general-purpose computer, a special-purpose computer, an embedded processor, or processors of other programmable data processing devices may be provided with these computer program instructions, so as to create a machine, such that an apparatus for realizing functions designated in one or more processes in the flowcharts and/or in one or more blocks in the block diagrams, may be created by performing instructions by a computer or processors of other programmable data processing devices.

These computer program instructions may further be stored in a computer readable storage that can direct a computer or other programmable data processing devices to work in a specific way, such that a product containing an instruction apparatus can be manufactured based on the computer readable storage storing the instructions therein, and the instruction apparatus realizes the functions designated in one or more processes in the flowcharts and/or in one or more blocks in the block diagrams.

These computer program instructions may further be loaded into a computer or other programmable data processing devices, such that a series of operating steps may be performed on the computer or other programmable data processing devices, so as to generate processes realized by the computer, and steps for realizing the functions designated in one or more processes in the flowcharts and/or in one or more blocks in the block diagrams may be provided by executing the instructions on the computer or other programmable data processing devices.

The above descriptions are merely embodiments of the present disclosure, and are not intended to limit the present disclosure. Any modifications, equivalent substitutions or improvements that are made within the spirit and principle of the present disclosure should all be included in the protection scope of claims of the present disclosure.

What is claimed is:

1. A method for acquiring labeled data, comprising:
   acquiring a 3D-3D registration sample, wherein the 3D-3D registration sample comprises a sample 3D image, a reference 3D image and 3D-3D registration data, and the 3D-3D registration data comprises correspondence data between the sample 3D image and the reference 3D image;
   generating at least one dual-2D-image based on the sample 3D image, wherein each dual-2D-image is a combination of 2D projection images of the sample 3D image in two different directions; and
   generating 2D-3D registration data corresponding to each dual-2D-image based on the 3D-3D registration data, wherein each 2D-3D registration data comprises correspondence data between the dual-2D-image and the reference 3D image;
   wherein acquiring the 3D-3D registration sample comprises:
      acquiring the reference 3D image and at least one set of sample 2D images, wherein each set of sample 2D images comprises a number of 2D images acquired by imaging a same object in a number of different directions respectively;
      reconstructing each set of sample 2D images into one sample 3D image respectively; and
      acquiring the correspondence data between each sample 3D image and the reference 3D image by a 3D-3D image registration; and
   wherein generating at least one dual-2D-image based on the sample 3D image comprises combining, in each set of sample 2D images, every two 2D images having a predetermined angular interval into the dual-2D-image.

2. The method according to claim 1, wherein: the 3D-3D registration data comprises coordinates of a number of positioning points which are positioned in the sample 3D image, and the 2D-3D registration data comprises coordinates of the number of positioning points in each 2D projection image of the dual-2D-image; and generating the 2D-3D registration data corresponding to each set of the dual-2D-images based on the 3D-3D registration data comprises:
   converting the coordinates of the number of positioning points in the sample 3D image into the coordinates of the number of positioning points in the each 2D projection image of the dual-2D-image, based on a projection relationship between any dual-2D-image and the sample 3D image.

3. The method according to claim 1, wherein two 2D projection images of each dual-2D-image have a same image form as that of a computed tomography image, an X-ray fluoroscopy image, a nuclear magnetic resonance image, an ultrasonic image or a fluorescence fluoroscopy image.

4. A training method, comprising:
   acquiring a number of labeled data by the method as defined in claim 1, wherein each of the labeled data comprises one dual-2D-image and 2D-3D registration data corresponding to the dual-2D-image; and
   training a machine learning model with the number of labeled data, to determine model parameters for 2D-3D image registration,
   wherein input of the machine learning model comprises the dual-2D-image, output of the machine learning model comprises the 2D-3D registration data, and the number of labeled data are used as at least one of training data or test data during training.

5. The training method according to claim 4, wherein training the machine learning model with the number of labeled data to determine the model parameters for the 2D-3D image registration comprises:

optimizing the model parameters acquired based on the training data with the test data.

6. A non-transitory computer-readable storage medium, wherein the computer-readable storage medium stores a computer program comprising a program instruction, and the program instruction, when being executed by a processor, causes the processor to execute the method as defined in claim 4.

7. Medical equipment comprising a processor and a memory, wherein a program instruction is stored in the memory, and the processor is configured to call the program instruction in the memory to execute the method as defined in claim 4.

8. A training apparatus, comprising a processor and a memory storing a program instruction which is executable by the processor, wherein the processor is configured to:
acquire a number of labeled data by the method as defined in claim 1, wherein each of the labeled data comprises one dual-2D-image and 2D-3D registration data corresponding to the dual-2D-image; and
train a machine learning model with the number of labeled data, to determine model parameters for 2D-3D image registration,
wherein input of the machine learning model comprises the dual-2D-image, output of the machine learning model comprises the 2D-3D registration data, and the number of labeled data are used as at least one of training data or test data during training.

9. The training apparatus according to claim 8, wherein the processor is further configured to optimize the model parameters acquired based on the training data with the test data.

10. A non-transitory computer-readable storage medium, wherein the computer-readable storage medium stores a computer program comprising a program instruction, and the program instruction, when being executed by a processor, causes the processor to execute the method as defined in claim 1.

11. An apparatus for acquiring labeled data, comprising a processor and a memory storing a program instruction which is executable by the processor, wherein the processor is configured to:
acquire a 3D-3D registration sample, wherein the 3D-3D registration sample comprises a sample 3D image, a reference 3D image and 3D-3D registration data, and the 3D-3D registration data comprises correspondence data between the sample 3D image and the reference 3D image;
generate at least one dual-2D-image based on the sample 3D image, wherein each dual-2D-image is a combination of 2D projection images of the sample 3D image in two different directions; and
generate 2D-3D registration data corresponding to each dual-2D-image based on the 3D-3D registration data, wherein each 2D-3D registration data comprises correspondence data between the dual-2D-image and the reference 3D image;
wherein the processor is further configured to:
acquire the reference 3D image and at least one set of sample 2D images, wherein each set of sample 2D images comprises a number of 2D images acquired by imaging a same object in a number of different directions respectively;
reconstruct each set of sample 2D images into one sample 3D image respectively;
acquire the correspondence data between each sample 3D image and the reference 3D image by a 3D-3D image registration; and
combine, in each set of sample 2D images, every two 2D images having a predetermined angular interval into the dual-2D-image.

12. The apparatus according to claim 11, wherein: the 3D-3D registration data comprises coordinates of a number of positioning points which are positioned in the sample 3D image, and the 2D-3D registration data comprises coordinates of the number of positioning points in each 2D projection image of the dual-2D-image; and the processor is further configured to:
convert the coordinates of the number of positioning points in the sample 3D image into the coordinates of the number of positioning points in each 2D projection image of the dual-2D-image, based on a projection relationship between any dual-2D-image and the sample 3D image.

13. The apparatus according to claim 11, wherein two 2D projection images of each dual-2D-image have a same image form as that of a computed tomography image, an X-ray fluoroscopy image, a nuclear magnetic resonance image, an ultrasonic image or a fluorescence fluoroscopy image.

14. Medical equipment comprising a processor and a memory, wherein a program instruction is stored in the memory, and the processor is configured to call the program instruction in the memory to execute a method for acquiring labeled data comprising:
acquiring a 3D-3D registration sample, wherein the 3D-3D registration sample comprises a sample 3D image, a reference 3D image and 3D-3D registration data, and the 3D-3D registration data comprises correspondence data between the sample 3D image and the reference 3D image;
generating at least one dual-2D-image based on the sample 3D image, wherein each dual-2D-image is a combination of 2D projection images of the sample 3D image in two different directions; and
generating 2D-3D registration data corresponding to each dual-2D-image based on the 3D-3D registration data, wherein each 2D-3D registration data comprises correspondence data between the dual-2D-image and the reference 3D image;
wherein acquiring the 3D-3D registration sample comprises:
acquiring the reference 3D image and at least one set of sample 2D images, wherein each set of sample 2D images comprises a number of 2D images acquired by imaging a same object in a number of different directions respectively;
reconstructing each set of sample 2D images into one sample 3D image respectively; and
acquiring the correspondence data between each sample 3D image and the reference 3D image by a 3D-3D image registration; and
wherein generating at least one dual-2D-image based on the sample 3D image comprises combining, in each set of sample 2D images, every two 2D images having a predetermined angular interval into the dual-2D-image.

15. The medical equipment according to claim 14, wherein: the 3D-3D registration data comprises coordinates of a number of positioning points which are positioned in the sample 3D image, and the 2D-3D registration data comprises coordinates of the number of positioning points in each 2D projection image of the dual-2D-image; and generating the 2D-3D registration data corresponding to each set of the dual-2D-images based on the 3D-3D registration data comprises:
    converting the coordinates of the number of positioning points in the sample 3D image into the coordinates of the number of positioning points in each 2D projection image of the dual-2D-image, based on a projection relationship between any dual-2D-image and the sample 3D image.

* * * * *